Jan. 15, 1963 G. A. WINKLER 3,073,171

TUNER CONTROL APPARATUS

Filed May 31, 1961 2 Sheets-Sheet 1

INVENTOR.
Gustav A. Winkler
BY Mueller & Aichele
Attys.

Jan. 15, 1963 G. A. WINKLER 3,073,171

TUNER CONTROL APPARATUS

Filed May 31, 1961 2 Sheets-Sheet 2

INVENTOR.
Gustav A. Winkler
BY
Mueller & Aichele
Attys 3,073,171
TUNER CONTROL APPARATUS
Gustav A. Winkler, Wheaton, Ill., assignor to Motorola, Inc., Chicago, Ill., a corporation of Illinois
Filed May 31, 1961, Ser. No. 113,840
6 Claims. (Cl. 74—10.45)

This invention relates to radio receivers and more particularly to a universal radio receiver tuner control apparatus.

Patent No. 2,453,927, issued in the name of William Race and assigned to the assignee of the present invention, recognizes that most auto radio receivers are positioned behind the dashboard of a car and have a pair of shafts for manual volume and tuning adjustment extending through apertures formed in the dashboard. The positioning of these apertures varies from car to car, and therefore one who purchases an automobile without a radio and subsequently wishes to install a receiver would be forced to purchase a receiver in which the relative position of the control shafts corresponds to the apertures provided in the dashboard of the car.

In the installation of a universal radio receiver, that is, one which is not custom designed to a particular dashboard, the tuner control shaft should be adapted to be moved horizontally and vertically of a fixed tuner shaft and within an opening in the receiver front plate in order to fit openings formed in the dashboard of the device in which the receiver is mounted. In addition, adjustment of the receiver shaft positions should be able to be performed without removal of the cover from the radio or otherwise gaining access to the inside of the radio housing.

It is therefore an object of the present invention to provide a radio receiver assembly having adjustable volume, tuning control shafts and mounting bushings wherein the spacing between the shafts can be adjusted to allow installation in an automobile or similar device having dashboard apertures for reception of the mounting bushings and radio controls.

A further object of this invention is to provide a radio receiver tuner control mechanism exhibiting a minimum amount of backlash.

Another object of the present invention it to provide a radio receiver having mounting bushings and control shafts which may be adjustably positioned without necessitating removal of the receiver cover.

Another object of the invention is to provide a radio receiver tuning mechanism control shaft assembly wherein the fixed tuner shaft is positioned perpendicular to an adjustable control shaft mounted in the front plate of the receiver.

Still another object of the invention is to provide a compact adjustable tuning control mechanism of inexpensive construction.

A feature of the present invention is the provision of a radio receiver tuner control mechanism having a control shaft which is radially adjustable with respect to the axis of a fixed shaft mounted on the tuner.

A further feature of the present invention is the provision of an automobile radio receiver having a tuner control mechanism including an adjustable control shaft, a tuner shaft, and an idler shaft affording a driving connection between the control shaft and tuner shaft wherein the control shaft and idler shaft are rotatable about the axis of the tuner shaft to afford horizontal and vertical adjustment therebetween.

Another feature of the present invention is the provision of an improved tuner control mechanism including a rigid tuner shaft rotatable about its own axis and having a drive disc mounted thereon, and an adjustable control shaft having a pair of pinch washers gripping the tuner shaft drive disc whereby the control shaft is horizontally and vertically adjustable about the axis of the tuner shaft.

Still another feature of the present invention is the provision of a radio receiver tuner mechanism adapted for mounting behind and parallel with a dashboard having a rigid rotatable tuner shaft and a dish shaped drive disc fixed on the tuner shaft. An adjustable idler shaft having a pair of dish shaped pinch washers engages the dish shaped drive disc, and an adjustable control shaft having its axis substantially perpendicular to the axis of the tuner shaft and having a pair of pinch washers grippingly engage a second drive disc mounted on the idler shaft.

A further feature of the present invention is the provision of an idler shaft rotatably mounted between a rigid tuner shaft and a spaced control shaft and adapted to afford a driving relationship therebetween whereby both the idler shaft and control shaft can be moved horizontally and vertically with respect to the tuner shaft and whereby the control shaft can be moved to a position coaxial with the tuner shaft.

Figures 2, 3A, 3B, 3C:
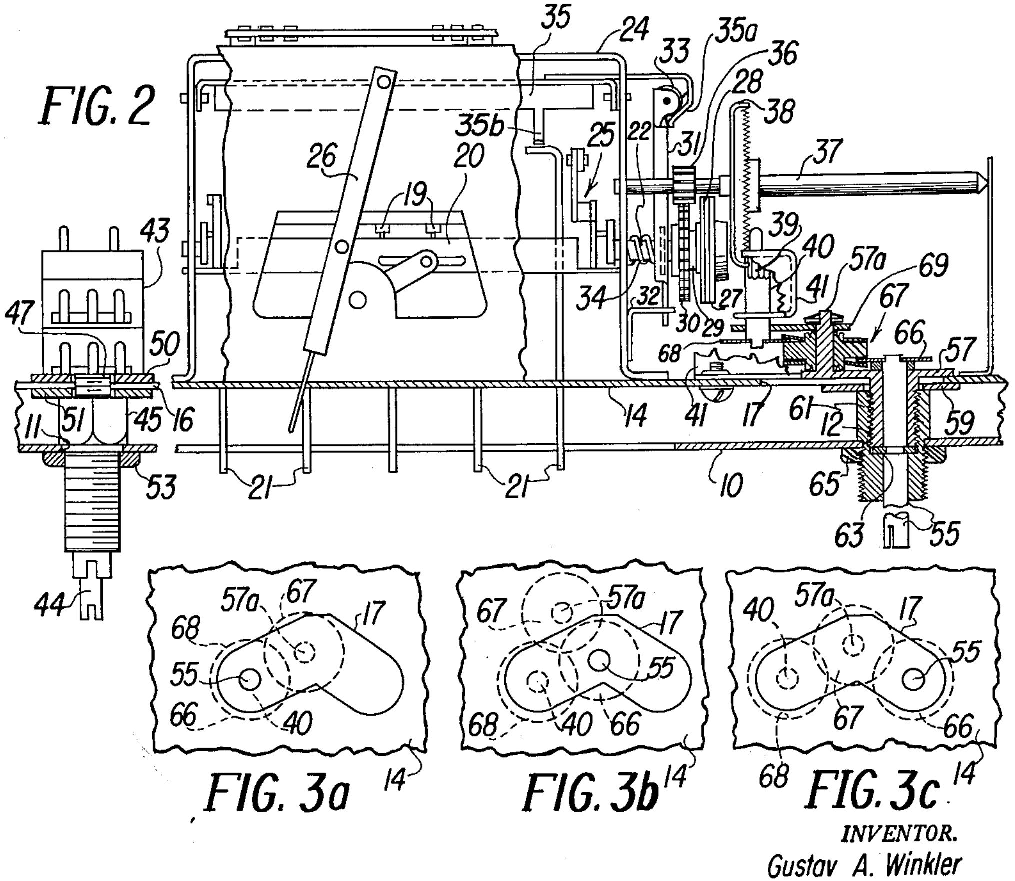
FIG. 2 is a plan view of a radio receiver control apparatus in accordance with the present invention.
Figure 4:
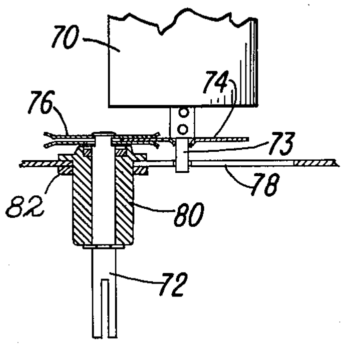
Figure 6:
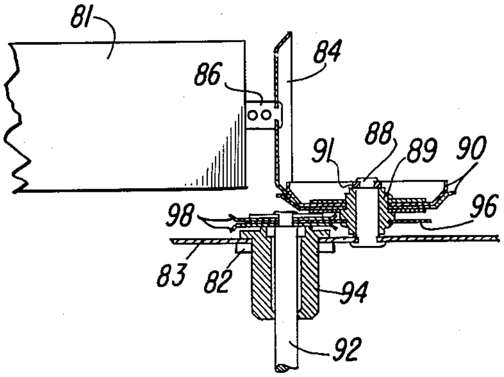
Figure 5:
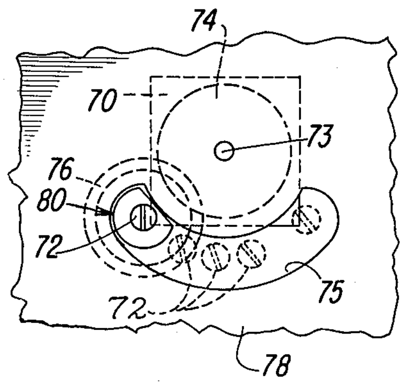
Figure 7:
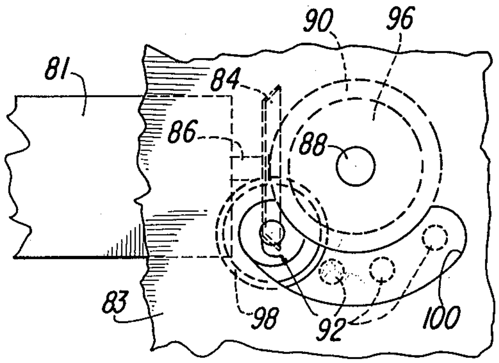

FIGS. 3*a*, 3*b* and 3*c* are front views of various positions of the control shaft of FIG. 2;

FIG. 4 is a cross-sectional view of a modified tuner control apparatus in accordance with the present invention;

FIG. 5 is a front view of a section of a radio receiver front plate showing various positions of the tuner control shaft of FIG. 4 in the front plate aperture;

FIG. 6 is a cross-sectional view of a still further modified form of the tuner control apparatus of the present invention; and FIG. 7 is a front view illustrating various positions of the control shaft of FIG. 6 in the front plate aperture.

In accordance with the present invention, a radio receiver is provided having an adjustable tuner control mechanism wherein a control shaft may be variously positioned about the axis of a rigid tuner shaft. In one embodiment the tuner control assembly includes a control shaft adjustably mounted by means of a bushing within an opening formed in a radio receiver front plate. A drive disc, mounted upon the end of the control shaft is gripped in tight frictional engagement by a pinch washer assembly mounted on an intermediate idler shaft. The pinch washer assembly mounted on the idler shaft also holds in gripping relationship a second drive disc mounted upon a tuner shaft. The idler shaft is movable about the axis of the tuning shaft and the control shaft is movable about the axis of both the tuning shaft and the idler shaft, so that the control shaft may be moved within the circle defined by the combined rotation of the idler shaft about the axis of the tuner shaft and the control shaft about the idler shaft.

In another form the pinch washer assembly may be mounted directly upon the control shaft. These pinch washers may thus grip a drive disc mounted upon the tuner shaft. A movable mounting bushing may serve to secure the control shaft to the front plate of the receiver.

The invention also provides a control mechanism for a tuner disposed parallel to the front plate of the receiver wherein pinch washers are carried by the control shaft and a drive disc mounted upon an intermediate idler shaft is gripped therein. A second pair of pinch washers are disposed upon the intermediate idler shaft coaxially with the drive discs. These last named pinch washers are saucer shaped to receive an accurate portion of the peripheral edge of a saucer shaped drive plate mounted upon the tuner shaft. It will be understood that the drive discs and pinch washers may be interchangeably mounted on the shafts so long as the driving relationship remains the same.

Figure 1:
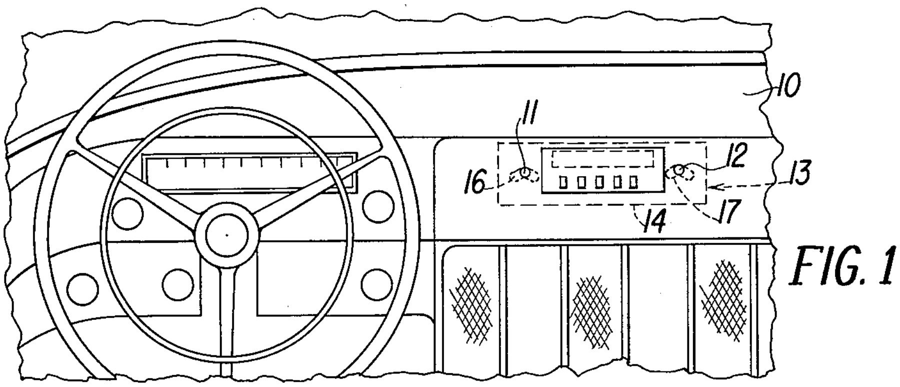
FIG. 1 is a view illustrating the mounting of a radio receiver behind the dashboard of a typical automobile.

FIG. 1 shows a typical automobile dashboard 10 with spaced openings 11 and 12 formed therein to accommodate manual control shafts for a radio receiver 13. The front plate 14 of the receiver 13 is provided with a pair of generally crescent shaped apertures 16 and 17, which are illustrated in detail in FIG. 3. It will be understood that the apertures 16 and 17 may be of any suitable configuration to accommodate a desired control shaft movement referred to herein. The spacing between openings 11 and 12 will vary among the different makes of cars but the variation generally would not be so great that the control shafts would not fit within the openings in some position through the crescent shaped apertures 16 and 17 of the front plate 14 of the receiver 13.

The receiver control apparatus of FIG. 2 includes the adjustable tuning cores 19 operatively connected to a carriage 20 which may be reciprocated in order to position the cores 19 for tuning purposes. Carriage 20 may be properly positioned for selected channels by operation of sliding pushbuttons rods 21. Since suitable mechanism for this operation is known, this portion of the apparatus is not illustrated. However, it may be understood that rotation of the shaft 22, which is journaled in the tuner frame 24, will also drive the carriage 20 through linking mechanism 25 for tuning purposes. An indicator arm 26 is driven by the carriage 20 in order to indicate on a dial the frequency to which the tuner is adjusted.

A clutch drive disc 27 is fixed to shaft 22 to be rotatable therewith. A disc 28 is driven by the clutch disc 27 and disc 28 is mounted on a bushing 29 in common with the pair of gears 30. Shaft 22 turns within bushing 29 when discs 27 and 28 are disengaged. Lever 31 rides in a slot of bushing 29 to move therewith. Lever 31 is pivotally mounted at one end to bracket 32 and carries a roller 33 at its other end. A spring 34 is positioned between the frame 24 and the lever 31 in order to urge bushing 29 to the right and urge the disc 28 against clutch disc 27 for a driving relationship therebetween.

A lever actuator 35 is rotatably mounted to the frame 24 and this actuator includes a cam surface **35*b* which is rounded to be engaged by a rod 21, and a similar cam surface is associated with each rod. When a pushbutton is operated the actuator 35 is rotated as the cam surface 35*b* is urged upwardly as viewed in FIG. 2, thereby rotating the actuator 35 in a clockwise direction as viewed from the right end of the tuning apparatus. Accordingly, such rotation of the actuator 35 will move a further cam surface 35*a* thereof upwardly to pivot lever 31 to the left as the roller 33 moves along the surface of the cam 35*a*. In this manner as a pushbutton is operated, the lever 31, the pair of gears 30 and the disc 28** are moved to the left to open the clutch and thus eliminate the frictional drag of the further driving mechanism of the tuner when the device is operated by means of a pushbutton.

It will be understood that the present invention has equal application to tuners in which only rotational manual tuning is provided and that the pushbutton structure is shown merely as an example of one form of receiver in which the invention may be utilized.

A pinion 36 is affixed to the shaft 37 to be rotatable therewith. The pinion 36 is in driving engagement with the pair of gears 30 which are rotationally spring biased with respect to one another so that the meshing of gears 30 and the pinion 36 will be tight and will have no lost motion. A crown gear 38 is also affixed to shaft 37 and the crown gear is meshed with the pinion 39 on the shaft 40. A bracket 41 has a U-shaped portion to rotatably support the shaft 40 at two different spaced positions in order to maintain the pinion 39 meshed with the crown gear 38. Bracket 41 is shown cut away in order to more clearly illustrate other portions of the mechanism although it will be understood that bracket 41 extends upwardly and above the remaining portions of the driving mechanism and is mounted to the front plate 14 of the receiver.

While it will be noted that shaft 40 extends perpendicular to the front plate 14, and could thus be extended to project outwardly of the receiver so that it could be manually rotated by means of a suitable knob mounted thereon, a problem would be encountered when the receiver is mounted to a dashboard 10 in which the alignment of the aperture through which shaft 40 would extend is not properly spaced from the aperture 11 in the dashboard 10 through which the shaft of volume control 43 would extend. The volume control 43 includes a control shaft 44 which extends outwardly of the dashboard 10 and to which a control knob may be affixed. The control 43 is mounted in the crescent shaped opening 16 in front plate 14 by means of a tapped bushing 45 which is threaded on the bushing 47 of the control. Suitable washers 50 and 51 are positioned on opposite sides of the front plate 14 to give proper mounting surfaces across portions of the opening 16. A threaded portion of the bushing 45 is extended through the aperture 11 of the dashboard 10 and a suitable nut 53 is threaded thereon to form one mounting point for the entire receiver 13.

Thus, the bushing 45 can be loosened upon the bushing 47 to permit the control 43 to assume numerous positions within the crescent shaped opening 16. This is, of course, possible since control 43 is connected to other portions of the receiver merely through flexible leads. Furthermore, it can be appreciated that bushing 45 may be loosened externally of the receiver and that it is unnecessary to open the casing of the receiver 13 in order to adjustably position the control 43.

Since it is generally necessary from the standpoint of good appearance to have the pushbutton rods 21 centered between the control shafts 44 and 55, it is also necessary to permit adjustable positioning of the mechanical control mechanism for the tuning of the receiver. A control shaft 55 is rotatably mounted in the bushing 57 which includes a threaded portion projecting through the opening 17. A washer 59 is disposed between the outer surface of the front plate 14 and the tapped bushing 61 in order to secure the shaft 55 with respect to the front plate 14. A portion of the bushing 57 extends along the back side of the front plate 14 to give proper support across the sides of the aperture 17. A C-washer 63 is positioned on shaft 55 to retain this shaft with respect to the bushing 57. The bushing 61 includes a shoulder which bears against the inner surface of the dashboard 10 and a fastening nut 65 may be threaded upon the bushing 61 to mount the entire assembly with respect to the dashboard 10. It can be seen that mounting of a receiver to the dashboard 10 is effected through fastening both the volume control bushing 45 and the tuning control bushing 61.

The drive disc 66 is affixed to the inward end of shaft 55 and a portion of the periphery of this disc is captured on one side of the pinch washer assembly 67. The assembly 67 is rotatably mounted on a stud **57*a* of the bushing 57. A second portion of the pinch washer assembly is in driving engagement with a disc 68 which is affixed to one end of the shaft 40. A link 69 is joined between the shaft 40 and the stud 57*a* in order to maintain proper spacing between these members and to maintain the disc 68 captured by the pinch washer assembly 67. Accordingly, it may be seen that manual rotation of the shaft 55 will turn disc 66 causing rotation of the pinch washer assembly and driving of the disc 68. Disc 68 will, of course, drive the shaft 40 and the pinion 39 to rotate crown gear 38 and such action will cause rotation of shaft 37 and pinion 36 and gears 30. The tuner will then be driven through the discs 28 and 27 and rotation of the shaft 22**.

When it is desired to adjust the position of shaft 55, and assuming that the receiver is not mounted to a dashboard 10 and thus that the nut 65 is removed, the bushing 61 is loosened thereby allowing disc 66 to be rotatably positioned with respect to the pinch washer assembly 67. Engagement of disc 66 in the pinch washer assembly 67 is maintained because the assembly 67 is rotatably affixed to the stud **57*a* and the disc 66 is affixed to the shaft 55 which is rotatably mounted within the bushing 57. In addition to the positioning of disc 66 with respect to the pinch washer assembly, that assembly may also be variously positioned with respect to the disc 68. In this way, but limited by the aperture in the front plate of the receiver, shaft 55 may be positioned anywhere within a circle having a radius equal to the maximum spacing between shaft 40 and stud 57*a* plus the maximum spacing between stud 57*a* and the shaft 55**.

Various positions which the assembly may assume in aperture 17 are shown in FIGS. 3*a*, 3*b* and 3*c*. It may be seen that the control shaft 55 is radially and circumferentially movable about the axis of the tuning drive shaft 40 and that the control shaft 55 may even be moved into alignment with the shaft 40, as shown in FIG. 3*a*. It is further pointed out that the adjustment of the shaft 55 is accomplished by merely loosening bushing 61 and sliding the bushing 57 within the crescent shaped aperture 17. This can be accomplished entirely from the exterior of the receiver 13.

FIG. 4 is a further embodiment of the present invention wherein the rigid tuner shaft 73 is connected directly to the control shaft 72 by means of drive disc 74 mounted on the rigid tuner shaft and held in frictional engagement by pinch washer assembly 76 mounted on the control shaft 72. The control shaft 72 is mounted to the front plate 78 by means of mounting bushing 80 which is held in engagement with the front plate 78 by nut 82. The tuner mechanism 70 is mounted parallel with the control shaft 72. The path of the control shaft 72 within the crescent shaped opening 75 is shown in FIG. 5. The drawing illustrates various radial positions which the control shaft 72 may assume about the axis of the rigid tuner shaft 73.

FIG. 6 illustrates still another embodiment of the invention wherein a tuner 81 is mounted parallel to the front plate 83 of the receiver. In this embodiment a saucer shaped drive plate 84 is mounted upon the tuning shaft 86. An idler bushing 89 is rotatably mounted upon a stud 88 which is fastened to front plate 83. Bushing 89 is retained on stud 88 by C washer 91. A saucer shaped pinch washer assembly 90 is mounted on bushing 89 to frictionally engage the outer peripheral edge of the drive plate 84. The control shaft 92 is mounted upon the front plate of the receiver by means of bushing 94. Bushing 94 may be mounted upon the front plate 83 by a nut 82 as shown in FIG. 4. A drive disc 96 mounted on the bushing 89 is held in frictional engagement by a pinch washer assembly 98 mounted upon the control shaft 92. The path of the control shaft 92 within the crescent shaped opening 100 formed in the front plate 83 of the receiver is shown in FIG. 7.

The invention provides therefore an adjustable tuner control mechanism for simple alignment of shaft center positions on automobile radios. The adjustment is achieved without the necessity of removing the radio receiver front plate because the control shaft is relatively movable with respect to the tuner shaft within an opening formed in the front plate. The invention is intended for use primarily with universal auto radios whereby adjustable shaft centers allow greater installation possibilities.

I claim:

1. In a radio receiver adapted to be mounted behind a dashboard and including a tuner mechanism, a tuner shaft positioning mechanism including in combination, a first shaft rotatably mounted for driving said tuner mechanism, a drive disc fixedly mounted upon said first shaft, a front plate mounted on said receiver, said front plate having an opening formed therethrough, said first shaft having a fixed axis of rotation with respect to said opening, a bushing adjustably mounted in said front plate opening, a second shaft rotatably mounted in said bushing, pinch washer means mounted upon said second shaft to frictionally receive an arcuate portion of the peripheral edge of said drive disc, said second shaft having its axis substantially parallel to the axis of said first shaft whereby said second shaft is adjustable about the axis of said first shaft.

2. In a radio receiver including a tuner assembly the combination of a front plate fixedly mounted on said receiver, a volume control potentiometer adjustably mounted within an opening formed in said front plate, a tuner shaft rotatably mounted for driving said tuner, said tuner shaft having a fixed axis of rotation with respect to said opening, a control shaft, means adjustably mounted on said front plate within a second opening formed therethrough adapted to rotatably receive said control shaft therethrough, an idler shaft substantially parallel to said tuner shaft, means adapted to afford a driving connection between said tuner shaft and said idler shaft, and means adapted to afford a driving connection between said control shaft and said idler shaft, whereby said control shaft and bushing means are radially adjustable with respect to said idler shaft and horizontally and vertically adjustable with respect to said potentiometer.

3. In a universal auto radio receiver including a tuner assembly and adapted to be mounted behind a dashboard and having an elongated substantially crescent shaped opening formed in the front plate thereof, a tuner shaft positioning mechanism including a first rigid shaft rotatably mounted within the tuner mechanism to control the operation thereof, said first shaft being mounted substantially parallel to the front plate, a saucer shaped drive plate mounted on said first shaft, a second shaft rotatably mounted upon the receiver and extending within said front plate opening perpendicular to said first shaft, rotatable means disposed between said first and said second shafts adapted to afford a driving connection therebetween, said rotatable means including means adapted to frictionally grip said saucer shaped drive plate, whereby said second shaft and said last named means are radially adjustable about the axis of said first shaft to provide adjustment of shaft center positions.

4. In a radio receiver including a tuner assembly wherein the receiver is adapted to be mounted behind the dashboard of an automobile having spaced control shaft openings formed therethrough, an adjustable tuner control mechanism adapted to position a tuner control shaft to correspond to an available opening in the automobile dashboard including, in combination, a front plate fixedly mounted upon said receiver, a first shaft rotatably mounted for driving the tuner assembly to control the operation thereof, a disc shaped drive member mounted upon said first shaft in coaxial relationship thereto, a bushing adjustably disposed through the opening formed in said front plate, a second shaft rotatably mounted within said bushing and substantially parallel with said first shaft, a drive disc mounted upon said second shaft in coaxial relationship thereto, an intermediate idler shaft having means disposed thereon to frictionally engage an arcuate portion of the peripheral edge of said first and second disc members to afford a driving connection therebetween, whereby said second shaft is radially adjustable with respect to said idler shaft and said idler shaft is radially adjustable with respect to said first shaft and manual rotation of said second shaft is transmitted to said first shaft through said intermediate idler shaft.

5. In a radio receiver including a tuner assembly, a tuner control mechanism adapted to adjust to available openings in a dashboard including, a front plate fixedly mounted on said receiver and having a plurality of spaced openings therethrough, a rigid first shaft rotatably mounted for driving the tuner assembly and having a drive disc mounted thereon, said first shaft further having a fixed axis of rotation substantially perpendicular to said front plate, a second shaft disposed through one of said openings formed in said front plate and having a drive disc mounted thereon, bushing means mounted upon said second shaft to maintain said second shaft in engagement with the peripheral edge of said front plate defining said one of said openings formed in said front plate, an idler shaft disposed between said first shaft and said second shaft, linking means disposed upon said idler shaft rotatably maintaining said idler shaft in spaced relationship to said first shaft and rotatably maintaining said second shaft in spaced relationship to said idler shaft, means defining a pinch washer assembly mounted upon said idler shaft to frictionally engage the peripheral edge of said first shaft drive disc, second pinch washer means mounted upon said idler shaft to frictionally engage the peripheral edge of said second shaft drive disc, whereby rotation of said first shaft is transmitted through said idler shaft to said first shaft to drive the tuner assembly and whereby said second shaft is horizontally and vertically adjustable within said one of said openings in said front plate with respect to said first shaft.

6. In a radio receiver adapted to be mounted behind a dashboard and having a tuner included therein, a tuner control mechanism, including in combination, a front plate mounted on the receiver and having inner and outer sides and a curved slot formed therein, tuner drive means including a rigid driven shaft having a fixed axis of rotation with respect to said slot and further including a disc for driving said shaft, a bushing mounted in said slot and being adjustable to varying positions therein, a control shaft rotatably mounted in said bushing and having driving means thereon engageable with said disc for driving the same, said control shaft being manually rotatable from the outer side of said front plate, whereby said control shaft may be secured at any desired position in said slot by adjusting said bushing.

References Cited in the file of this patent

UNITED STATES PATENTS

| | | |
|---|---|---|
| 2,181,318 | Fessenden | Nov. 28, 1939 |
| 2,445,211 | Drake | July 13, 1948 |
| 2,613,540 | Keim | Oct. 14, 1952 |
| 2,747,415 | Bennett | May 29, 1956 |
| 2,953,827 | Race | Sept. 27, 1960 |